US006083550A

United States Patent [19]

Cochran et al.

[11] Patent Number: 6,083,550

[45] Date of Patent: Jul. 4, 2000

[54] READY-TO-ASSEMBLE, READY-TO-EAT PACKAGED PIZZA

[75] Inventors: Stuart A. Cochran, Tarrytown, N.Y.; Steven J. Goll, McFarland, Wis.; Howard C. Lippincott, Madison, Wis.; Gary A. Winkler, Cottage Grove, Wis.

[73] Assignee: Kraft Foods, Inc., Madison, Wis.

[21] Appl. No.: 09/026,275

[22] Filed: Feb. 19, 1998

Related U.S. Application Data

[62] Division of application No. 08/563,845, Nov. 28, 1995, Pat. No. 5,747,084.

[51] Int. Cl.[7] .................................................... A21D 13/00

[52] U.S. Cl. .............................. 426/549; 426/62; 426/94; 426/275; 426/496

[58] Field of Search ............................... 426/62, 94, 549, 426/275, 283, 496

[56] References Cited

U.S. PATENT DOCUMENTS

| | | | |
|---|---|---|---|
| D. 224,207 | 7/1972 | Cyr et al. . | |
| D. 235,499 | 6/1975 | Day . | |
| D. 305,204 | 12/1989 | Reifein et al. | D9/418 |
| D. 305,205 | 12/1989 | Grindrod et al. | D9/418 |
| D. 328,566 | 8/1992 | Griesbach et al. | D9/425 |
| D. 335,442 | 5/1993 | Detert et al. | D9/418 |
| D. 335,445 | 5/1993 | Detert et al. | D9/418 |
| D. 335,820 | 5/1993 | Detert et al. | D9/418 |
| D. 335,821 | 5/1993 | Detert et al. | D9/418 |
| D. 336,241 | 6/1993 | Detert et al. | D9/418 |
| D. 336,242 | 6/1993 | Detert et al. | D9/418 |
| D. 337,048 | 7/1993 | Detert et al. | D9/418 |
| D. 337,268 | 7/1993 | Detert et al. | D9/418 |
| D. 339,743 | 9/1993 | Zellner et al. | D9/347 |
| 3,979,525 | 9/1976 | Plemons et al. | 426/321 |
| 4,500,548 | 2/1985 | Silva | 426/62 |
| 4,606,923 | 8/1986 | Ricke | 426/496 |
| 5,009,867 | 4/1991 | Kratochvil | 426/120 |
| 5,042,652 | 8/1991 | Grindrod | 206/45.34 |
| 5,119,940 | 6/1992 | Grindrod | 206/45.31 |
| 5,123,527 | 6/1992 | Hustad | 206/45.31 |
| 5,167,973 | 12/1992 | Snyder | 426/115 |
| 5,236,119 | 8/1993 | Chu | 229/2.5 R |
| 5,312,634 | 5/1994 | Griesbach et al. | 426/106 |
| 5,375,701 | 12/1994 | Hustad et al. | 206/45.18 |
| 5,421,510 | 6/1995 | Calvert | 229/125.35 |

OTHER PUBLICATIONS

Oscar Mayer Lunchables® advertisements circa. 1990 and multi–view photographs of Lunchables® tray.

Doerry, Wulf, "Basics of Water Activity", Proceedings of American Society of Bakery Engineers—66th Annual Meeting, 1990, pp. 63–71.

*Primary Examiner*—Lien Tran
*Attorney, Agent, or Firm*—Cook, Alex, McFarron, Manzo, Cummings & Mehler, Ltd.

[57] ABSTRACT

A baked pizza crust is provided having a water activity in the range of about 0.6–0.85, the baked crust being suitable for use in a refrigerated, ready-to-eat pizza kit. Also provided is a kit for preparing ready-to-eat pizza, the kit including pizza crust, pizza sauce and one or a plurality of pizza toppings which are hermetically sealed from the external atmosphere in a package having a base tray and a top fitted and sealed to said base tray. Preferably, each food item is in a separate compartment sealed from the other food items to substantially retard or prevent flavor, moisture and microbial migration from one food item to another.

17 Claims, 2 Drawing Sheets

READY-TO-ASSEMBLE, READY-TO-EAT PACKAGED PIZZA

This is a division of application Ser. No. 08/563,845, filed Nov. 28, 1995 now U.S. Pat. No. 5,747,084.

FIELD OF THE INVENTION

The invention relates to a pizza food product and a kit for assembling same. In particular, the invention relates to a fully baked pizza crust, storable at refrigeration and room temperatures, which crust has satisfactory texture and palatability when served either cold or heated. The invention further relates to a kit for assembling a ready-to-eat pizza, which kit contains said fully baked pizza crust and other components necessary to assemble a ready-to-eat pizza.

BACKGROUND OF THE INVENTION

Food products which require a minimum amount of consumer preparation and are quick to prepare are common items on grocery store shelves and in refrigerator or freezer cases. Examples range from cheese and cracker snacks and canned stews to refrigerated bagels and some frozen dinners. Typically, such products will be eaten as packaged or after a brief heating period, preferably by microwave heating. Notably absent from this category are pizza products having a fully baked or a partially baked pizza crust.

Pizza products, while widely available frozen, are generally not as widely available as a refrigerated product. Refrigerated pizza products tend to be manufactured and distributed in a relatively small locale. In either case, the available pizza products, frozen or refrigerated, need to be fully baked before they can be eaten. One reason that refrigerated or frozen pizzas having baked or partially baked crusts are not available lies in the fact that once a fully baked pizza crust, which is a bread, has been refrigerated or frozen, it tends to "toughen" or become leathery, stale and/or dry as does bread crust. E. David, *English Bread and Yeast Cookery, American Edition* (Viking Press, New York 1977) page 225. The term "leathery" as used by David and herein is a term of art. When a crust becomes leathery, it becomes harder to chew, thereby losing "chewability". Furthermore, the distinction between the crisper bottom of the crust and the softer top part of the crust is lost when a baked crust is refrigerated, regardless of whether the crust is later eaten cold or reheated.

Reheating pizza, a common mode for consuming leftover pizza will not make the crust return to its original state and may serve both to further "toughen" it and decrease the distinction between the crisper and softer parts of the crust. Most people have had an experience with leathery or tough pizza crust when they have eaten cold or reheated leftover pizzeria pizza. While such leftover pizza may be fully edible from all health and safety considerations, the eating enjoyment obtained from such leftovers are generally less than those experienced when the pizza was eaten fresh due to the crust becoming leathery.

For these reasons, fully baked pizzas or pizzas having a fully baked crust are not often found in grocery refrigerator or freezer cases.

Refrigerated pizzas with unbaked crust will also encounter additional problems which are avoided in a frozen product. These are (1) the sauce soaking into the crust (moisture migration), (2) the sauce and other toppings becoming maldistributed on or knocked off the crust during transport, and (3) flavor, odor and microbiological migration, e.g. from sauce or meat to cheese. While these problems may be avoided to some extent by turning the refrigerated, unbaked crust product into a kit from which a pizza can be assembled, this procedure will not result in a ready-to-eat pizza as described by the present invention because the crust of such pizza, in fact the entire pizza, will still have to be baked in a normal manner as for a frozen pizza or in a pizzeria.

Thus, there exists a need for a pizza crust which can be baked, refrigerated and subsequently eaten cold, warm or hot (i.e., reheated) without further baking and without the crust becoming leathery or there occurring any significant degradation of crust properties relative to the same properties of the crust when freshly baked; and said crust being equally tasty and chewable either hot or cold.

There further exists a need for a ready-to-eat pizza and kit containing a baked crust, which kit and crust can be refrigerated without the crust becoming leathery, dry and/or stale; said refrigerated crust being equally tasty and satisfactorily chewable either hot or cold. It is preferable that the ready-to-eat pizza be provided in kit form, said kit having the components necessary to assembly a ready-to-eat pizza.

Thus it is an object of the invention to provide a pizza crust which may be refrigerated without becoming leathery, tough, dry and/or stale when served either hot or cold.

It is a further object of the invention to provide a kit, preferably a kit which can be refrigerated, containing all the ingredients for assembling a ready-to-eat pizza, said kit comprising a pizza crust which can be refrigerated without becoming leathery when served either hot or cold, pizza sauce and selected toppings for said pizza crust to thereby make a pizza.

SUMMARY OF THE INVENTION

The invention comprises a pizza crust which can be baked, refrigerated and served cold or reheated without becoming leathery, dry, stale and/or tough, said crust having a water activity in the range 0.6–0.85 and retaining satisfactory texture and chewability characteristics throughout. The invention further comprises a kit for preparation of a ready-to-eat pizza, said kit including (1) a fully baked pizza crust having a water activity in the range of about 0.6–0.85, which retains its texture and chewability characteristics upon refrigeration and (if desired) upon heating just prior to consumption, (2) pizza sauce, (3) cheese, and (4) such additional components as required to make a specific type of pizza; for example to include sausage, pepperoni, anchovy, olive, double cheese and the like, without being limited to exclusively to these listed pizza toppings.

DETAILED DESCRIPTION OF THE INVENTION

Figure 1:
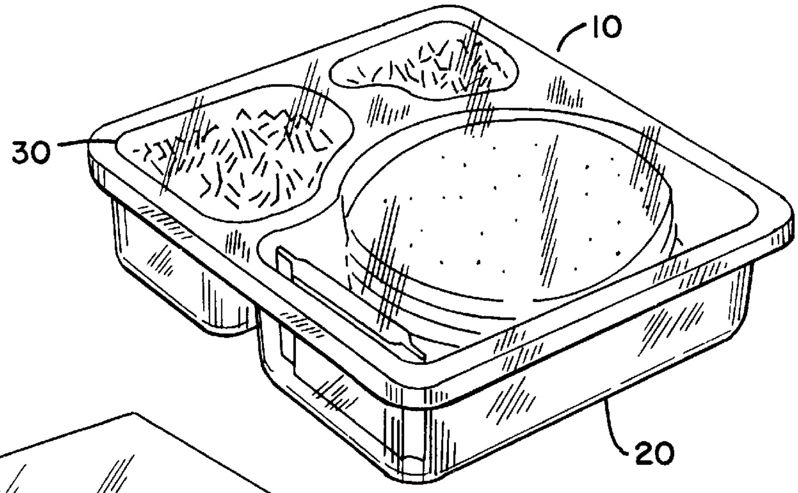
FIG. 1 is a perspective view of a ready-to-eat pizza kit in accordance with the invention, with the components of said kit in compartments.

The invention comprises a fully baked pizza crust suitable for use in a pizza food product. The invention further comprises a kit containing said crust and additional components for the assembly of a ready-to-eat pizza. In a preferred embodiment, the invention comprises a fully baked pizza crust which can be refrigerated without development of a leathery texture when eaten cold or reheated, and additional components in the refrigerated kit containing said pizza crust from which kit one may assemble a ready-to-eat pizza.

The percentages used herein are baker's percentages which are weight percents based on the weight of flour used in a specific recipe, generally per 100 pounds of flour. For example, when 100 pounds of flour are used in a recipe, 57% water and 1.5% salt would mean the addition of 57 pounds of water and 1.5 pounds of salt, respectively, to 100 pounds of flour. It should be noted that when baker's percentages are used, the total percentages do not have to equal 100%.

Baking science involves a complicated process employing time, temperature and relative humidity to produce various food products. The time, temperature and relative humidity parameters are different for bread, rolls, pizza crusts, pastry and cereal products, not only with regard to their appearance (crust color, size, etc.), but also with regard to the development and functioning of formula ingredients responsible for dough development, texture and size. Some of the desirable changes caused by baking are protein denaturing, starch gelatinization, moisture migration and veracity (cell development or grain). Although many factors may be involved in preparing a product which is appealing in the eyes of the ultimate consumer, a manufacturer must also consider items such as shelf life and how a consumer will actually use a product. Consequently, it is desirable to have some quantitative measure by which one can determine whether a production line product meets specification. One such measure is water activity.

Water activity is a measure of the percent of water remaining in a baked product after it has been baked. Cracker products typically have a water activity in the range of about 0.35–0.5. Common baked goods, for example, bread, dinner rolls and pizza crusts, typically have a water activity in the range of about 0.9–0.98. In contrast to these common baked goods and pizza crusts, a baked pizza crust prepared in accordance with the invention will have a water activity falling in the range of about 0.6–0.85. The preferred water activity range for a pizza crust prepared in accordance with the invention is about 0.7–0.8. It has been found that when a pizza crust is prepared according to the invention and has a water activity within the range of about 0.6–0.85, such crust has satisfactory refrigeration storage characteristics in addition to having satisfactory texture and taste when used to prepare a ready-to-eat pizza, whether unheated or heated and whether eaten cold or warm.

The water activity of the pizza crust is measured after the crust has come out of the oven and cooled to about 100° F. For a pizza crust prepared according to the invention, water activity is measured about 10–15 minutes after the crust has come out of the oven and cooled to a temperature of about 100° F. Moisture content may be measured by weight difference between the crust after it has cooled to about 100° F. as above and has been further dried, for example, in a desiccator, or by any other suitable reliable manner.

When yeast is used in the preparation of baked goods such as pizza crusts, a fermentation or rising step should be included in the dough preparation. The fermentation step allows the yeast to produce carbon dioxide gas which stretches and mellows the gluten contained in the flour, and aids in producing good flavor and texture. However, in large commercial baking operations such as will be used to prepare the crusts of the invention, fermenting all the dough to be baked requires large equipment outlays, is time consuming and is therefore costly. It has been found that in practicing the invention, one can produce a flavorful and texturally pleasing pizza crust by fermenting a portion of the dough and adding an aliquot of the fermented dough to bulk unfermented dough. The fermented dough is thoroughly mixed with the unfermented dough, the resulting mixture is divided, cut to size, and baked. In the time period from mixing to baking, the dough mixture continues to rise and develop the desired characteristics. It has been found that a dough mixture containing about 2–7% fermented dough and about 93–98% unfermented dough produces satisfactory results. A preferred mixture contains about 3–5% fermented dough.

The texture of the baked pizza crust of the invention can be further improved by laminating the dough somewhat in the manner used to prepare croissants or Danish pastries. A laminate of three to six layers, preferably three to four layers, may be formed by folding the dough back-and-forth across itself. Lamination is believed to result in a baked product having improved texture and taste when cold or heated.

A basic recipe (in baker's percentages) for pizza crust prepared according to the invention will be as follows: 100 pounds flour, 50–60% water, 4–5% vegetable oil, 4–5% solid vegetable shortening, 1–1.5% salt, 2–3% sugar and 0.3–0.7% dried yeast. The flour is hard wheat bread flour made from hard spring or winter wheat. The vegetable oil may be any vegetable oil which will not impart an unexpected or unusual taste. The preferred oils are corn, canola, sunflower seed, cottonseed and soybean oils, or mixture thereof, and similar oils and mixtures. The solid vegetable shortening is a solid, hydrogenated or partially hydrogenated vegetable oil; for example, a hydrogenated or partially hydrogenated cottonseed, corn, soybean, sunflower, canola, or mixture thereof, and similar hydrogenated or partially hydrogenated vegetable oils and mixtures. The preferred solid shortening will have a butter flavoring agent added to the shortening by the producer. Alternatively, a butter flavoring agent or other flavoring agent may be added to the recipe in an amount known to those skilled in the art or in accordance with the flavor manufacturer's recommendations. Compressed yeast may be substituted for the dried yeast used in the above basic recipe. If compressed yeast is used, the baker's percentage or weight is approximately doubled to account for the water content of the compressed yeast. Therefore, if compressed yeast is used in the above general recipe in place of dried yeast, the amount of compressed yeast will be in the range of about 0.6–2.4%.

The following example of a typical pizza dough according to the invention is given to further illustrate the invention. The example is not to be considered limiting or otherwise restrictive of the invention.

EXAMPLE 1

Pizza Dough

A pizza dough was made using 100 pounds of flour, 57 pounds (%) water, 4.3 pounds (%) corn oil, 4.3 pounds (%) solid shortening containing butter flavor, 1.25 pounds (%) salt, 2.3 pounds (%) sugar and 0.5 pounds (%) yeast. The dough ingredients were mixed, fermented dough comprising 3–5% by weight of the above ingredients was added, and the resulting dough mixture was kneaded using commercial equipment and in a manner known to those skilled in the art. The fermented dough had been previously prepared according to the same recipe and allowed to rise or ferment for a sufficient time before use. Generally, the dough is allowed to ferment until it is about one and one-half to double in size before use.

After mixing and kneading the dough mixture, the dough was sheeted, die-cut into circles and transferred to the belt of a baking oven. The dough is then baked for a time and at one or more temperatures in a manner known to those skilled in the baking arts to produce a pizza crust which has a water activity in the range of 0.7–0.8, after cooling as described above. While as illustrated in the Figures, the pizza crusts are preferably circular in shape, other crust shapes are within the scope of the invention. For example, the crusts can be triangular, square, wedge-shaped, shaped like a spaceship or car, or have other shapes.

The baked pizza crust is then assembled in a package with other pizza ingredients to form a kit from which a ready-to-eat pizza can be assembled. The kit typically comprises the baked crust, sauce, a first topping comprising a cheese or a mixture of cheeses, and one or a plurality of additional toppings, said additional toppings being either cheese or non-cheese. Examples of sauces include tomato-based, salsa, catsup-based, white sauce or other spreadable sauce usable to create flavorful pizza-style products. Examples of the cheeses which may be included in the kit comprise mozzarella, parmesan, romano, swiss, cheddar, monterey jack, gruyere, and similar cheeses as might be used on pizza. Examples of the additional toppings comprise pepperoni, salami, sausage including wieners, Italian, Polish and similar sausages, Canadian bacon, cooked ground beef, cooked ham or bacon, artificial bacon flavored bits, olives, anchovies, peppers, onions, shrimp, crab and similar toppings found on pizza.

The components comprising the ready-to-eat pizza kit are placed in a food package, when desired together with a drink, a candy, an implement or utensils to spread the sauce, and the like. Food packages of the type used for the ready-to-eat pizza kit of the invention have been described in the art; for example, in U.S. Pat. No. 5,375,701 to Hustad et al. FIGS. 1–5 illustrate a type of packaging preferred for containing the components of a ready-to-eat pizza according to the invention. Those skilled in the art will recognize that similar types of packaging using a greater or lesser number of compartments, and/or a greater or lesser number of packets containing the pizza components or ingredients, can be used in practicing the invention.

Figure 4:
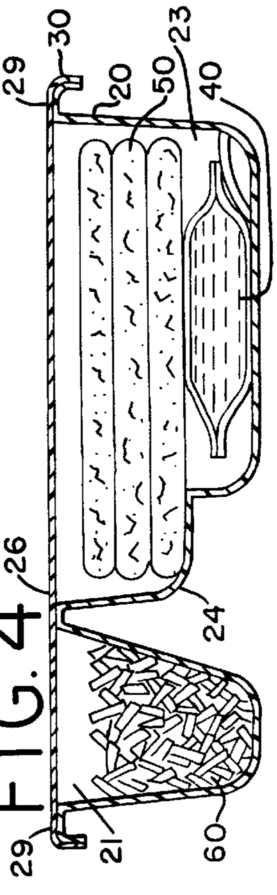
FIG. 4 is an elevational view of a pizza kit in accordance with the invention and the components thereof.

A food package containing the components for a ready-to-eat pizza is generally illustrated in FIG. 1. The food package 10 comprises a rigid tray base 20 having one or a plurality of recessed compartments and a top 30 which can be fitted to base 20 and sealed thereto as illustrated in FIG. 4, for example by heat sealing. As illustrated in FIG. 1, base 20 comprises a plurality of compartments separated by internal flanges to thereby contain the components of the pizza kit and to separate selected components thereof from one another.

Figure 2:
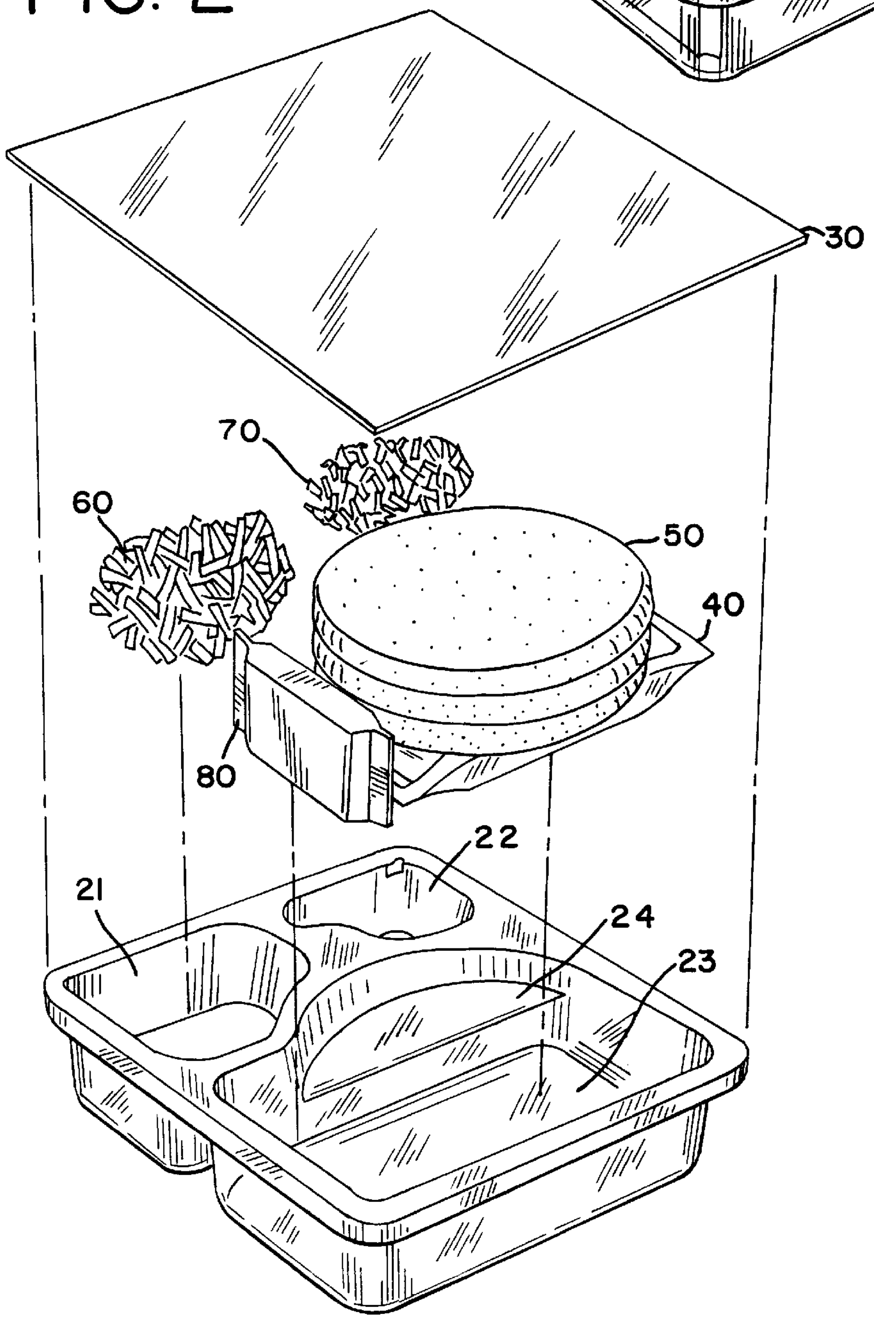
FIG. 2 is an exploded perspective view of a ready-to-eat pizza kit in accordance with the invention.

FIG. 2 is an exploded, oblique elevational view of a ready-to-eat pizza kit according to the invention and illustrated in FIG. 1; and further illustrating the rigid base tray 20 with recessed compartments 21, 22 and 23, top 30 made of a material which can be fitted and sealed to base 20, and the components of the ready-to-eat pizza kit, said components comprising a packet 40 containing pizza sauce, a plurality of roughly circular pizza crusts 50, shredded or cubed cheese or mixture of cheeses 60, a cheese or non-cheese topping 70 and a packet 80 containing an additional cheese or non-cheese topping such as, for example, grated cheese, loose cooked sausage or beef, spices, bacon bits or similar pizza ingredients. Compartment 23, which is illustrated as having a circularly shaped portion to accommodate circular pizza crusts, is further illustrated as having a shelf 24 to thereby provide support for crusts 50 when packet 40 is placed in compartment 23 under said crusts as is further illustrated in FIG. 4.

Figure 3:
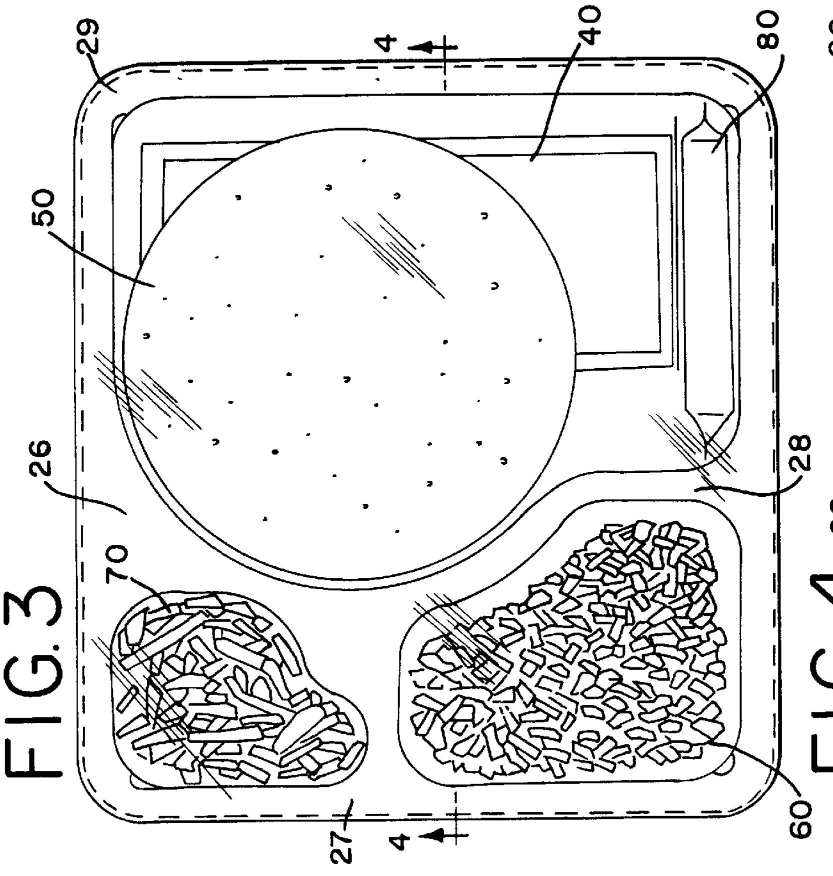
FIG. 3 is a top plan view of a pizza kit in accordance with the invention.

FIG. 3 is a top view of the pizza kit and packaging illustrating the positioning and separation of components of the ready-to-eat pizza kit of the invention. FIG. 3 illustrates the positioning of packet 40 within compartment 23 under crusts 50 and the positioning of packet 80 (which could include a candy treat, additional toppings and/or a spreading implement) within compartment 23 to the side of crusts 50 and packet 40.

FIG. 4, from which optional packet 80 has been omitted for viewing purposes, illustrates the positioning of packet 40 under crusts 50, the separation of compartment 21 from compartment 23, and the positioning and sealing of top 30 to base 20. Top 30 is preferably made of a transparent, flexible film or sheet material which can be printed upon if desired. The sheet is airtightly sealed to the periphery and flanges of base 20, and can be further sealed to base 20 at a portion of said base separating one compartment from another in order to hermetically and peelably seal the contents of the kit from the atmosphere and from one another. For example, in FIG. 4, top 30 is sealed to base 20 about its circumference as illustrated at 29 to hermetically separate all components of the kit from the external atmosphere; and top 30 is further sealed to base 20 as at 26 to hermetically separate compartments 21 and 23. The package as sealed is preferably gas flushed. Individual components could be gas flushed or vacuum sealed and placed in a tray in forming the kit.

Figure 5:
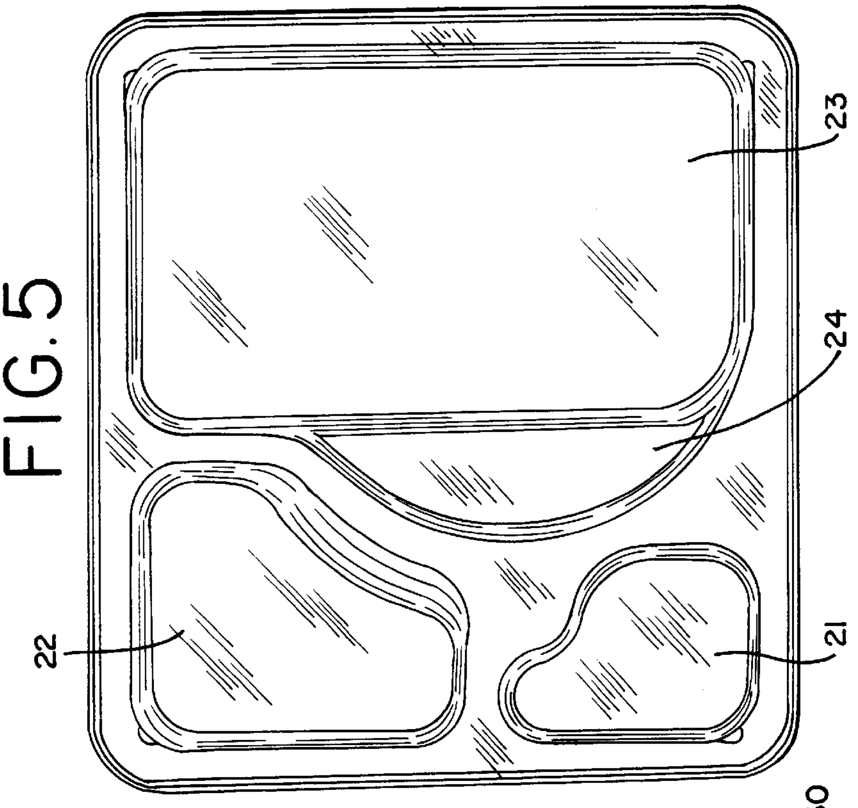
FIG. 5 is a bottom plan view of a tray suitable for use to contain the components of the pizza kit of the invention.

FIG. 5 is a bottom plan view of preferred base tray 20 further illustrating compartments 21, 22 and 23, and the separation between said compartments. Top 30 would be hermetically sealed to base tray 20 around the circumference as at 29 and between the compartments as at 26, 27 and 28 (see FIG. 3).

The following are examples of pizza kits encompassing the invention. The examples are offered by way of illustrating the invention and not by way of limitation. After assembling the pizza kits and sealing the top to the base tray, the kits are preferably stored at refrigeration temperatures. For use, the pizza kit package is opened, the crusts removed and the pizza assembled using the components in any order the user desires. Typically, sauce is spread on the crust, the non-cheese toppings, if any, are placed over the sauce, and the cheese toppings are then placed on top of all. The resulting pizza may be eaten as assembled or may be heated as recommended on the package or as desired by the consumer. Heating may be in a conventional or a microwave oven, microwave heating being preferable due to its speed. A recommended microwave heating time at full oven power falls within the range of about 20–80 seconds, and preferably within about 20–40 seconds in order to preserve the taste, texture and chewability characteristics of the crust.

EXAMPLE 2

Pepperoni Pizza Kit 1

Using FIG. 2 by way of illustration, a pepperoni pizza kit in accordance with the invention comprises a base tray 20 having recessed and separated compartments 21, 22, and 23 for containing pizza components, a top 30 sealable to a said base tray and pizza components; said pizza components comprising a pizza sauce packet 40, said packet containing a ready to use, spreadable pizza sauce; a plurality of pizza crusts 50 having a water activity in the range of 0.6–0.85, and preferably in the range 0.7–0.8; a cheese topping 60; and a pepperoni topping 70.

EXAMPLE 3

Pepperoni Pizza Kit 2

A kit is provided as in Example 2 wherein said kit contains a packet 80 containing a candy treat or an additional pizza component such as, for example, cheese or a mixture of cheeses, sausage, anchovies, olives, bacon, ham, cooked ground beef and similar pizza toppings.

EXAMPLES 4 AND 5

Sausage Pizza Kit

Kits are provided as in Examples 2 and 3 wherein the pepperoni is replaced by loose sausage such as, for example, cooked Italian or Polish sausage; loose cooked sausage meaning cooked sausage crumbles not in a casing.

EXAMPLE 6

Double Cheese Pizza

Kits are made up as in Examples 2 and 3 wherein the pepperoni is replaced by a cheese and when optional packet 80 is included, the contents of this packet is a candy treat or a cheese or a non-cheese pizza topping.

What is claimed is:

1. A baked pizza crust storable at refrigerated temperatures without detrimental effect to the texture and palatability of said crust, said crust comprising a refrigerated fully baked ready-to-eat pizza crust including:

(a) a dough baked from a formulation including flour and, per 100 pounds of flour, about 50–60% water, about 4–10% oil or fat component, yeast and fermented dough; and (b) said baked dough being a refrigerated fully baked ready-to-eat pizza crust having a water activity in the range of about 0.6–0.85 after baking and cooling.

2. The crust according to claim 1, wherein said water activity is in the range of about 0.7–0.8.

3. The crust according to claim 1, wherein said oil or fat component is about 4–5% vegetable oil and about 4–5% solid shortening.

4. The crust according to claim 3, wherein said yeast is selected from the group consisting of about 0.3–0.7% dried yeast and about 0.6–1.4% compressed yeast.

5. The crust according to claim 4, wherein said fermented dough is present in an amount of about 3–5% of the dough formulation.

6. The crust according to claim 3, wherein the water is about 57%, the oil is about 4.3%, the shortening is about 4.3%, and the yeast is selected from the group consisting of about 0.5% dried yeast and about 1% compressed yeast, said formulation also including salt and sugar.

7. The crust according to claim 6, wherein the water activity is about 0.7–0.8%.

8. A method of preparing a pizza crust having a water activity in the range of about 0.6–0.85, said method comprising:

(a) forming a dough formulation by mixing flour with, per 100 pounds of flour, about 50–60% water, about 4–5% vegetable oil, about 4–5% solid vegetable shortening, a yeast selected from the group consisting of about 0.3–0.7% dried yeast and about 0.6–1.4% compressed yeast, and fermented dough in an amount of about 3–5 weight percent of the total weight of said dough formulation; said fermented dough having been made from the foregoing ingredients and quantities, and fermented until said dough increases in bulk one and one-half to two times its original size; and the yeast being selected from the group consisting of about 0.3–0.7% dried yeast and about 0.6–1.4% compressed yeast;

(b) dividing said dough formulation, shaping said divided dough into a desired shape and placing said shaped dough on a baking surface;

(c) baking the shaped dough of step (b) for a time and at a temperature sufficient to produce a fully baked ready-to-eat pizza crust having a water activity in the range of about 0.6–0.85; and (d) refrigerating the fully baked ready-to-eat pizza crust.

9. The method of claim 8, wherein said water is about 57%, said oil is about 4.3%, said shortening is about 4.3%, and said yeast is selected from the group consisting of about 0.5% dried yeast and about 1% compressed yeast, and said dough formulation includes about 1 to 2% salt and about 2 to 3% sugar; and said baked pizza crust water activity is in the range of about 0.7–0.8.

10. A method of storing a baked pizza crust at refrigerated temperatures without detrimentally affecting the texture, palatability and chewability of the crust, said method comprising the steps of:

(a) forming a dough formulation by mixing flour with, per 100 pounds of flour, about 50–60% water, about 4–10% oil or fat component, a yeast selected from the group consisting of about 0.3–0.7% dried yeast and about 0.6–1.4% compressed yeast, and fermented dough in an amount of about 3–5 weight percent of the total weight of said dough formulation; said fermented dough having been made from the foregoing ingredients and quantities, and fermented until said dough increases in bulk one and one-half to two times its original size; and the yeast being selected from the group consisting of about 0.3–0.7% dried yeast and about 0.6–1.4% compressed yeast;

(b) dividing said dough formulation, shaping said divided dough into a desired shape and placing said shaped dough on a baking surface;

(c) baking the shaped dough of step (b) for a time and at a temperature sufficient to produce a fully baked ready-to-eat pizza crust having a water activity in the range of about 0.6–0.85;

(d) hermetically sealing the fully baked ready-to-eat pizza crust from the atmosphere; and (e) refrigerating and storing the thus refrigerated hermetically sealed fully baked ready-to-eat pizza crust without detrimentally affecting the texture, palatability and chewability of the crust.

11. The method according to claim 10, wherein said water is about 57%, said oil is about 4.3%, said shortening is about 4.3%, and said yeast is selected from the group consisting of about 0.5% dried yeast and about 1% compressed yeast, and said dough formulation includes about 1 to 2% salt and about 2 to 3% sugar; and said baked pizza crust water activity is in the range of about 0.7–0.8.

12. The method according to claim 10, wherein said water activity is in the range of about 0.7–0.8.

13. The method according to claim 10, wherein said oil or fat component is about 4–5% vegetable oil and about 4–5% solid shortening.

14. The method according to claim 10, wherein the water is about 57%, the oil or fat component is about 4.3% oil and about 4.3% shortening, and the yeast is selected from the group consisting of about 0.5% dried yeast and about 1% compressed yeast, said formulation also including salt and sugar.

15. The method according to claim 14, wherein the water activity is about 0.7–0.8%.

16. The method according to claim 10, wherein said hermetically sealing step further includes hermetically sealing other pizza components from the atmosphere and from the baked pizza crust, the other pizza components including a first topping which is a cheese and a second topping selected from the group consisting a cheese topping and a non-cheese topping; and said refrigerating step further includes storing said first topping and said second topping at said refrigeration temperature, the baked pizza crust, first topping and second topping being within a common overall package.

17. The method according to claim 16, wherein said water activity of the baked pizza crust is between about 0.7 and about 0.8.

* * * * *

UNITED STATES PATENT AND TRADEMARK OFFICE
CERTIFICATE OF CORRECTION

PATENT NO : 6,083,550

DATED : July 4, 2000

INVENTOR(S) : Stuart A. Cochran, Steven J. Goll, Howard C. Lippincott and Gary A. Winkler It is certified that error appears in the above-identified patent and that said Letters Patent are hereby corrected as shown below:

Col. 1, line 38, insert a comma --,-- before "page 225".
Col. 7, line 7, "range 0.7-0.8" should read --range of 0.7-0.8--.
Col. 10, line 4, "consisting a" should read --consisting of a--.

Signed and Sealed this

Tenth Day of April, 2001

*Attest:*

Nicholas P. Godici

NICHOLAS P. GODICI

*Attesting Officer* *Acting Director of the United States Patent and Trademark Office*